(12) United States Patent
Kamiya

(10) Patent No.: US 8,132,422 B2
(45) Date of Patent: Mar. 13, 2012

(54) COGENERATION SYSTEM

(75) Inventor: Hiroshi Kamiya, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 457 days.

(21) Appl. No.: 12/489,809

(22) Filed: Jun. 23, 2009

(65) Prior Publication Data

US 2009/0320503 A1   Dec. 31, 2009

(30) Foreign Application Priority Data

Jun. 26, 2008   (JP) .................................. 2008-167694

(51) Int. Cl.
 *F25B 27/00*   (2006.01)

(52) U.S. Cl. ........................................ 62/238.6; 62/434

(58) Field of Classification Search .................. 62/238.6, 62/323.2, 333, 430, 434, 435; 165/219, 283, 165/299; 60/597, 604; 237/12.1, 12.3 B
See application file for complete search history.

(56) References Cited

U.S. PATENT DOCUMENTS

| | | | | |
|---|---|---|---|---|
| 4,065,055 A * | 12/1977 | De Cosimo | ................... | 237/12.1 |
| 4,309,877 A * | 1/1982 | Tawse | ........................... | 62/238.1 |
| 4,715,192 A * | 12/1987 | Katz | ............................. | 62/323.1 |
| 4,843,832 A * | 7/1989 | Yamada et al. | .................. | 62/159 |
| 4,951,871 A * | 8/1990 | Hata et al. | ....................... | 237/12.1 |
| 5,607,013 A | 3/1997 | Inoue et al. | | |
| 5,819,843 A | 10/1998 | Inoue et al. | | |
| 5,966,954 A * | 10/1999 | Arima et al. | ..................... | 62/185 |
| 6,290,142 B1 * | 9/2001 | Togawa et al. | ................ | 237/12.1 |
| 6,598,397 B2 * | 7/2003 | Hanna et al. | ..................... | 60/651 |
| 6,630,816 B2 * | 10/2003 | Kotani et al. | ..................... | 322/37 |
| 6,679,433 B2 * | 1/2004 | Gordon et al. | ................. | 237/12.1 |
| 6,744,239 B2 * | 6/2004 | Fukushima et al. | ............... | 322/8 |
| 6,971,585 B2 * | 12/2005 | Johnson et al. | ............... | 237/12.1 |
| 7,040,544 B2 * | 5/2006 | Guyer | ........................... | 237/12.1 |
| 7,239,034 B2 * | 7/2007 | Gehret, Jr. | .................. | 290/40 B |
| 7,284,709 B2 * | 10/2007 | Guyer | ........................... | 237/12.1 |
| 2002/0108745 A1 * | 8/2002 | Kimura | ........................... | 165/236 |
| 2002/0153127 A1 * | 10/2002 | Togawa et al. | ................... | 165/51 |
| 2004/0079088 A1 * | 4/2004 | Hayakawa et al. | ............. | 60/784 |
| 2005/0115241 A1 * | 6/2005 | Shimada et al. | ................. | 60/698 |
| 2006/0037345 A1 * | 2/2006 | Kang et al. | ..................... | 62/323.1 |
| 2006/0037346 A1 * | 2/2006 | Cho et al. | ..................... | 62/323.1 |
| 2006/0054135 A1 * | 3/2006 | Shimada et al. | .......... | 123/406.11 |

(Continued)

FOREIGN PATENT DOCUMENTS

JP   2002-70646   3/2002

(Continued)

*Primary Examiner* — Mohammad Ali
(74) *Attorney, Agent, or Firm* — Oblon, Spivak, McClelland, Maier & Neustadt, L.L.P.

(57) ABSTRACT

A cogeneration system includes a coolant circuit through which a coolant is circulated for conducting a heat exchange with an exhaust heat generated by a power generation unit, a buffer tank provided at the coolant circuit and storing the coolant, a heating circuit including a heating power source and a heating terminal, the heating power source generating a heating water that is circulated to be supplied to the heating terminal, a heating water bypass circuit bypassing a flow passage of the heating circuit at a portion between an exit of the heating terminal and the heating power source, and a heat exchanging device performing a heat exchange between the heating water flowing through the heating water bypass circuit and the coolant.

5 Claims, 2 Drawing Sheets

U.S. PATENT DOCUMENTS

| | | | |
|---|---|---|---|
| 2006/0123821 A1* | 6/2006 | Ryu et al. | 62/238.7 |
| 2006/0123822 A1* | 6/2006 | Cho et al. | 62/238.7 |
| 2006/0123823 A1* | 6/2006 | Ha et al. | 62/238.7 |
| 2006/0191265 A1* | 8/2006 | Kang et al. | 60/659 |

FOREIGN PATENT DOCUMENTS

| | | |
|---|---|---|
| JP | 2003-21392 | 1/2003 |
| JP | 2003-56910 | 2/2003 |

* cited by examiner

COGENERATION SYSTEM

CROSS REFERENCE TO RELATED APPLICATIONS

This application is based on and claims priority under 35 U.S.C. §119 to Japanese Patent Application 2008-167694, filed on Jun. 26, 2008, the entire content of which is incorporated herein by reference.

FIELD OF THE INVENTION

The present invention relates to a cogeneration system.

BACKGROUND

A known cogeneration system is disclosed in JP2003-21392A (hereinafter referred to as Reference 1), for example. According to the cogeneration system disclosed, in a case where all multiple heating terminals such as floors are prevented from dissipating heat by means of a temperature adjustment function (i.e., an off state) because of a temperature increase during a heating operation, a heat exchange is conducted between hot water in a floor heating circuit and hot water in a hot water storage/supply circuit so as to store heat in the hot water storage/supply circuit (specifically, a hot water storage tank). As a result, the hot water in the floor heating circuit is prevented from reaching extremely high temperatures. In an exhaust heat circuit of a power generation unit (i.e., coolant circuit), a radiator for heat dissipation is omitted in view of energy saving.

According to the cogeneration system disclosed in Reference 1, surplus heat produced when the floors are heated (i.e., floor heating) is recovered and stored in the hot water storage tank. Thus, the hot water storage/supply circuit is inevitably provided at the cogeneration system. In this case, the hot water storage tank has generally a sufficient capacity for accommodating a hot water supply load for home usage, such as 100 liters or more, which leads to a large tank and a large space and an increased cost for installing the tank.

In addition, the heat stored in the hot water storage tank is used only for the hot water supply. Thus, when the hot water supply load is not present (i.e., the hot water supply is not required or used) for a long period of time, the surplus heat cannot be stored in the hot water storage tank. Even when a heating load is present, an operation of the cogeneration system including the power generation (usage of exhaust heat) is impossible. That is, the usage of the exhaust heat is impossible at a time of the heating operation because of an influence of the hot water supply load.

According to a different cogeneration system from that disclosed in Reference 1 such as a heat pump-type hot water supply system, a heat stored in a hot water storage tank for a hot water supply is used for heating. However, in this case, a temperature stratification within the hot water storage tank is broken by the heating operation, which leads to a decrease in energy saving and an enlargement of the system.

A need thus exists for a cogeneration system which is not susceptible to the drawback mentioned above.

SUMMARY OF THE INVENTION

According to an aspect of the present invention, the cogeneration system includes a coolant circuit through which a coolant is circulated for conducting a heat exchange with an exhaust heat generated by a power generation unit, a buffer tank provided at the coolant circuit and storing the coolant, a heating circuit including a heating power source and a heating terminal, the heating power source generating a heating water that is circulated to be supplied to the heating terminal, a heating water bypass circuit bypassing a flow passage of the heating circuit at a portion between an exit of the heating terminal and the heating power source, and a heat exchanging device performing a heat exchange between the heating water flowing through the heating water bypass circuit and the coolant.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

Figure 1:
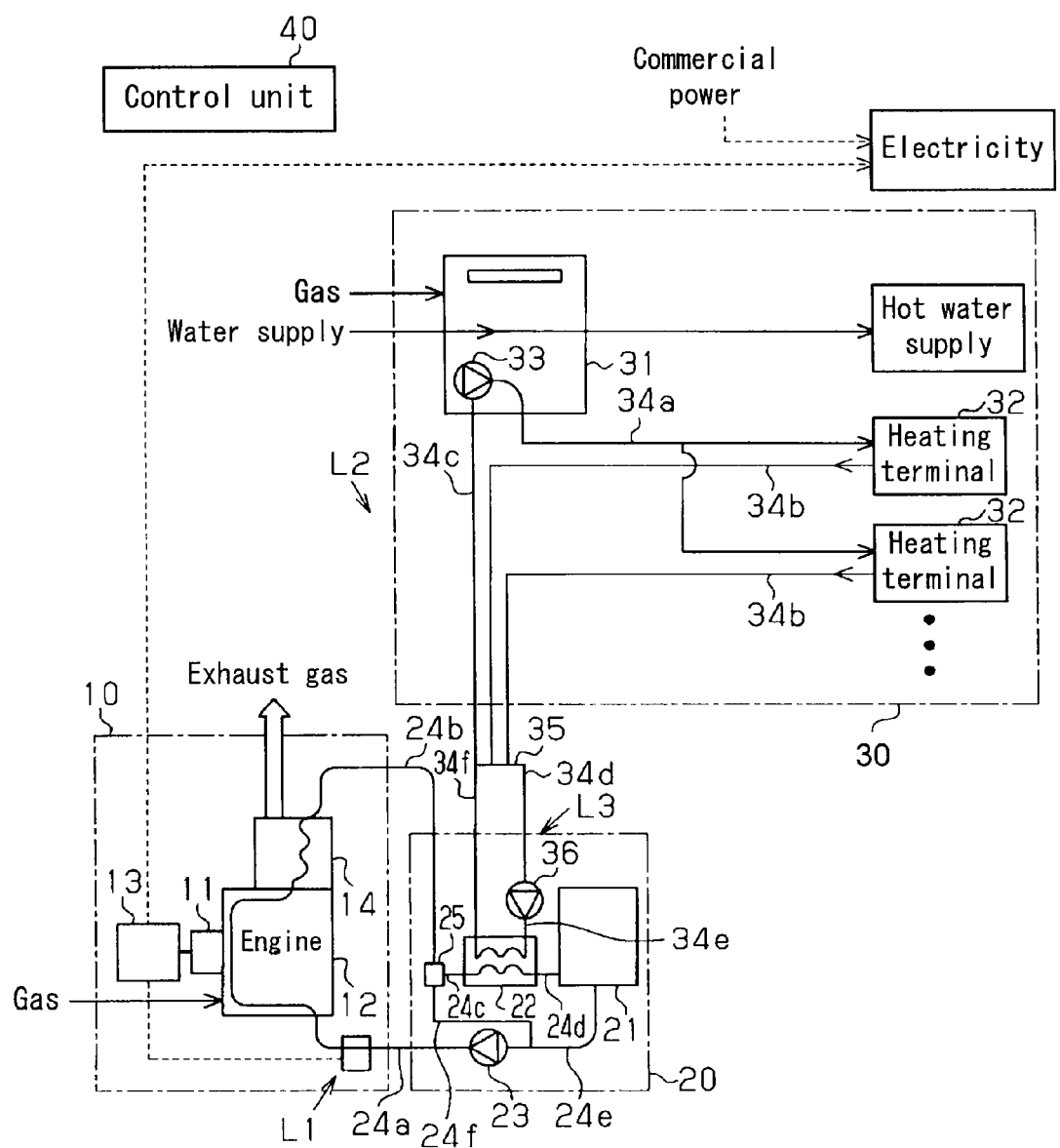
FIG. 1 is a circuit diagram illustrating a cogeneration system according to an embodiment of the present invention.

An embodiment of the present invention will be explained with reference to the attached drawings. As illustrated in FIG. 1, a cogeneration system of the present embodiment includes a power generation unit 10, a buffer tank unit 20, a hot water heater 30, and a control unit 40 for controlling the power generation unit 10, the buffer tank unit 20, and the hot water heater 30.

The power generation unit 10 includes an electrical generator 11, a gas engine 12, and an inverter 13. The gas engine 12 drives the electrical generator 11. The inverter 13 performs a frequency conversion of power from the electrical generator 11 so as to generate power that can be used with commercial power. The power generation unit 10 (specifically, the gas engine 12) is controlled by the control unit 40, so as to be operable upon heating (i.e., when the hot water heater 30 is operated). The gas engine 12 is driven by combustion of gas supplied to the gas engine 12. Exhaust gas emitted from the gas engine 12 is discharged to the outside of the cogeneration system by passing through an exhaust gas heat exchanger 14 (hereinafter simply referred to as an exhaust heat exchanger 14).

The buffer tank unit 20 includes a buffer tank 21, a hot water heater heat exchanger 22 (hereinafter simply referred to as a heater heat exchanger 22), and a coolant circulation pump 23. The buffer tank 21 stores a coolant for a heat exchange with the exhaust gas emitted from the power generation unit 10. The heater heat exchanger 22 serves as a heat exchanging means. The coolant circulation pump 23 creates a flow of the coolant and sends the coolant to the exhaust heat exchanger 14 connected via a fluid pipe 24a to an outlet port of the coolant circulation pump 23. The coolant sent to the exhaust heat exchanger 14 is heated thereat by means of the heat exchange with an exhaust heat generated by the gas engine 12. The exhaust heat exchanger 14 is connected to a wax-type thermostat valve 25 serving as a selector valve via a fluid pipe 24b. The thermostat valve 25 is connected to the heater heat exchanger 22 via a fluid pipe 24c. The heater heat exchanger 22 is connected to the buffer tank 21 via a fluid pipe 24d. The buffer tank 21 is connected to an inlet port of the coolant circulation pump 23 via a fluid pipe 24e. The thermostat valve 25 is also connected to the inlet port of the coolant circulation pump 23 (fluid pipe 24e) via a bypass fluid pipe 24f serving as a coolant bypass circuit. The thermostat valve 25 regulates an amount of coolant flowing to the bypass fluid pipe 24f, or to the heater heat exchanger, 22 and the buffer tank 21 by usage of a heat expansion of wax incorporated in the thermostat valve 25 depending on a temperature of the coolant.

Specifically, in a case where the temperature of the coolant is below a predetermined value (for example, 67° C.), the thermostat valve 25 is brought in a closed state so as to stop the flow of the coolant to the heater heat exchanger 22 and the buffer tank 21, i.e., to allow the coolant to flow to the bypass fluid pipe 24f. On the other hand, in a case where the temperature of the coolant exceeds a predetermined temperature (for example, 80° C.), the thermostat valve 25 is brought in an open state so as to allow the coolant to flow to the heater heat exchanger 22 and the buffer tank 21. The coolant circulation pump 23 is controlled by the control unit 40 so as to be operated upon heating (i.e., when the hot water heater 30 is operated). Then, the coolant is circulated depending on the open state or the closed state of the thermostat valve 25 that is determined on the basis of the temperature of the coolant. The fluid pipes 24a to 24e in addition to the coolant circulation pump 23, and the like collectively constitute a coolant circuit L1.

The coolant guided to the bypass fluid pipe 24f by the thermostat valve 25 is immediately heated at the exhaust heat exchanger 14 where the heat exchange with the exhaust heat of the gas engine 12 is repeatedly performed. On the other hand, the coolant guided to the heater heat exchanger 22, and the like by the thermostat valve 25 is able to perform the heat exchange with heating water of the hot water heater 30 flowing through the heater heat exchanger 22. Alternatively, a surplus heat of the coolant guided to the heater heat exchanger 22, and the like is temporarily stored in the buffer tank 21.

The hot water heater 30 includes a backup hot water supply system 31 constituting a heating power source for heating the heating water and multiple heating terminals 32 such as floors (i.e., floor heating). A heater pump 33 incorporated within the backup hot water supply system 31 creates a flow of the heating water and sends the heating water to the multiple heating terminals 32 connected to an outlet port of the heater pump 33 via a pipe 34a. The hot water heater 30 starts operating when the heater pump 33 is driven by the control unit 40. In addition, thermally actuated valves, for example, are provided at entrances of the respective heating terminals 32 so as to be opened or closed by a temperature adjustment function of the control unit 40. In a case where the thermally actuated valve is in an open state, the heating water flowing through the pipe 34a is supplied to the heating terminal 32. That is, an average heating ability of each of the heating terminals 32 is ensured and the heating terminal 32 is adjusted to a desired temperature level because the thermally actuated valve is intermittently opened or closed by a control of the control unit 40 so that a heat discharge is controlled. Exits of the respective heating terminals 32 are connected, via respective branch pipes 34b each having a relatively small diameter, to a single collecting pipe 35 serving as a flow passage having a relatively large diameter. The collecting pipe 35 is provided for collecting all of the branch pipes 34b so that the heating water supplied to the heating terminals 32 is collected to flow through the collecting pipe 35. The collecting pipe 35 is connected to an inlet port of the heater pump 33 via a pipe 34c. Thus, in a case where any one of the thermally actuated valves is in the open state, the heating water sent to the heater pump 33 is circulated through the pipe 34a, the branch pipe 34b, the collecting pipe 35, and the pipe 34c. At this time, the heating water heated by combustion of the gas supplied to the backup hot water supply system 31 is used for heating of the heating terminal 32. The pipe 34a, the branch pipe 34b, the collecting pipe 35, and the pipe 34c in addition to the heater pump 33, and the like constitute a heating circuit L2.

The collecting pipe 35 is connected, at an upstream side (i.e., an opposite side of the pipe 34c), to an inlet port of a heating water circulation auxiliary pump 36 via a bypass pipe 34d. An outlet port of the heating water circulation auxiliary pump 36 is connected to the heater heat exchanger 22 via a bypass pipe 34e. The heater heat exchanger 22 is connected to a downstream side of the collecting pipe 35 (i.e., where the pipe 34c is provided) via a bypass pipe 34f. Accordingly, in a case where the heating water circulation auxiliary pump 36 is operated, a portion of the heating water is circulated through the pipe 34a, the branch pipe 34b, and the pipe 34c by bypassing the collecting pipe 35. Then, the heating water that has bypassed the collecting pipe 35 is heated by the heat exchange with the coolant at the heater heat exchanger 22 (i.e., the coolant circuit L1) and used for heating of the heating terminal 32. Such heat source, by which the heating water is heated at the heater heat exchanger 22, is the exhaust heat from the gas engine 12 flown through the coolant circuit L1. The heating water circulation auxiliary pump 36 is controlled by the control unit 40 so as to be driven when a temperature of the coolant at an entrance of the buffer tank unit 20 (i.e., where the fluid pipe 24b is provided) exceeds a predetermined temperature (for example, 70 degrees C.). Then, the heat exchange between the heating water and the coolant is started at the heater heat exchanger 22. The control unit 40 monitors the temperature of the coolant at the entrance of the buffer tank unit 20 by a temperature sensor such as a thermistor provided at the coolant circuit L1. The bypass pipes 34d, 34e, and 34f in addition to the heating water circulation auxiliary pump 36 and the like constitute a heating water bypass circuit L3.

The backup hot water supply system 31 immediately heats water supplied thereto by means of gas combustion for hot water supply. That is, a hot water storage tank is omitted in the hot water heater 30 according to the present embodiment.

An operation of the cogeneration system according to the present embodiment will be explained below. Start and stop of the gas engine 12, of which operation is activated upon operation of the hot water heater 30, is controlled by the control unit 40 so that the temperature of the coolant in the coolant circuit L1 is prevented from excessively increasing. This is to avoid a driving of the gas engine 12 in a state where the heat dissipation is not sufficiently performed at the heating terminal 32, i.e., the exhaust heat of the gas engine 12 cannot be used for heating and only power generation is executed by the gas engine 12. The control unit 40 monitors the temperature of the coolant by a temperature sensor such as a thermistor provided at the entrance or the exit of the gas engine 12 (fluid pipe 24a or 24b) of the coolant circuit L1, for example.

First, the operation of the hot water heater 30 is started by the operation of the heater pump 33 so as to initiate the heating of the heating terminal 32. At this time, when the power generation unit 10 is driven by the control unit 40, the power generation unit 10 starts generating the power. Then, the heat exchange is conducted at the exhaust heat exchanger 14 between the exhaust heat of the gas engine 12 and the coolant circulating the coolant circuit L1.

At this time, in a case where the temperature of the coolant is low, the coolant is guided to the bypass fluid pipe 24f by the thermostat valve 25. The coolant is immediately heated through a repetition of the heat exchange with the exhaust heat of the gas engine 12 at the exhaust heater exchanger 14.

On the other hand, in a case where the temperature of the coolant is high, the coolant is guided to the heater heat exchanger 22 and the like by the thermostat valve 25. Then, the heat exchange of the coolant with the heating water in the heating water bypass circuit L3 is possible at the heater heat exchanger 22. Alternatively, a surplus heat of the coolant is temporarily stored in the buffer tank 21. That is, in a case where the temperature of the coolant is high, the operation of the heating water circulation auxiliary pump 36 causes the heating water to circulate through the bypass circuit L3. The heat exchange between the heating water and the coolant is executed at the heater heat exchanger 22. The heating water heated at the heater heat exchanger 22 is used for heating of the heating terminal 32.

In particular, in a case where the heat dissipation at the heating terminal 32 is not sufficiently conducted to thereby cause the heating load to be small, such as because all or portion of the thermally actuated valves of the multiple heating terminals 32 are in the closed state (i.e., off state), the temperature of the coolant of the coolant circuit L1 tends to increase. In this case, however, the surplus heat of the coolant is temporarily stored in the buffer tank 21 so as to continue the operation of the gas engine 12. A capacity of the buffer tank 21 is specified to a level at which the frequent start and stop of the gas engine 12 (i.e., an intermittent operation thereof) is avoidable, in consideration of an electrical power load for home usage and a general temperature adjustment operation (i.e., on/off operation) of the heating terminal 32 while an increase of an arrangement space of the buffer tank 21 is restrained. For example, the capacity of the buffer tank 21 is specified to be in a range from 10 litters to 50 litters.

Figure 2A:
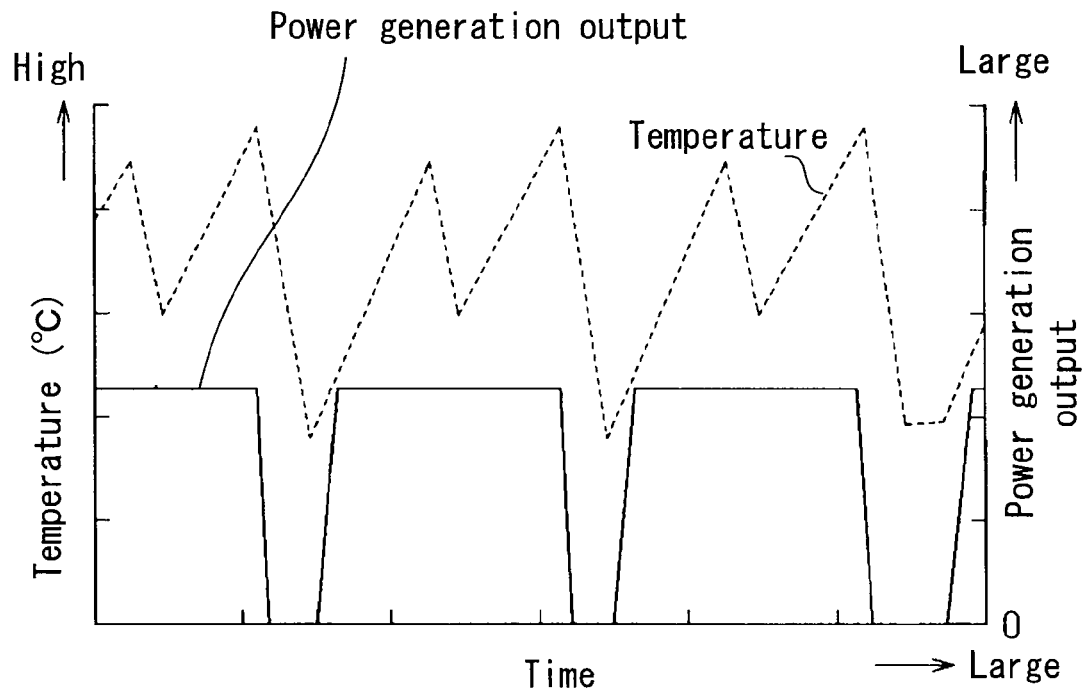
FIG. 2A is a time chart illustrating a transition of start and stop of a gas engine in response to a variation in heating load in a case where a buffer tank is not provided.
Figure 2B:
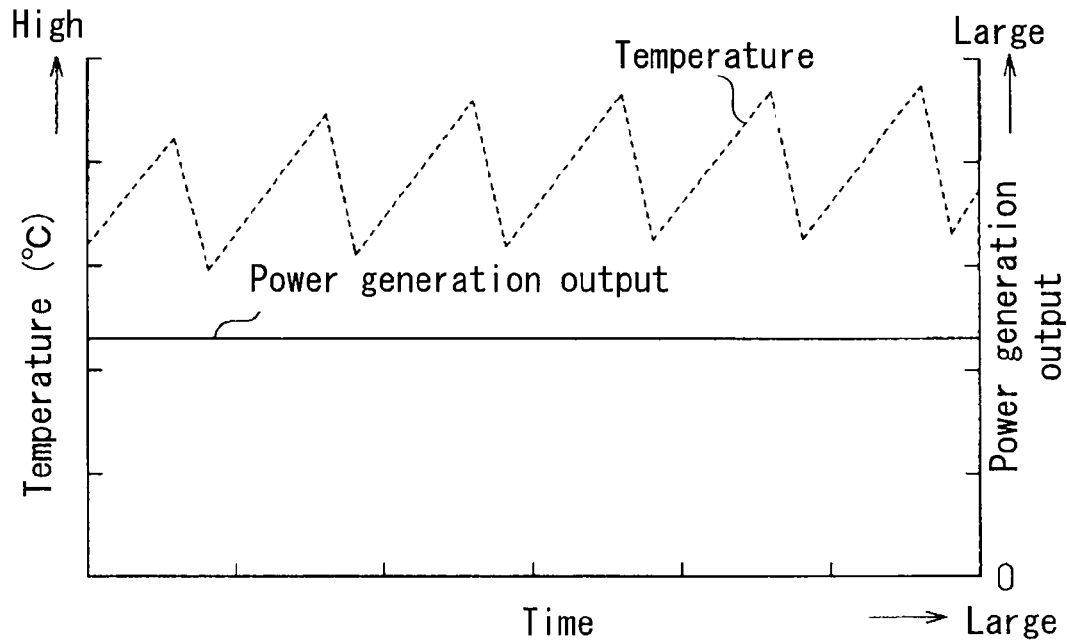
FIG. 2B is another time chart illustrating the transition of start and stop of the gas engine in response to the variation in heating load in a case where the buffer tank is provided.

FIGS. 2A and 2B are time charts each illustrating a transition of the start and stop of the gas engine 12 in accordance with a variation in heating load. FIG. 2A illustrates a case where the buffer tank is not provided while FIG. 2B illustrates a case where the buffer tank 21 having a predetermined capacity (for example, 10 litters) is provided. As clearly seen from FIG. 2A where the buffer tank is not provided, when the heat dissipation of the heating terminal 32 is stopped and therefore the heating load is decreasing, the temperature of the coolant increases rapidly and the further heat exchange of the coolant with the exhaust gas is impossible. As a result, the driving of the gas engine 12 is forced to be stopped (i.e., an output of the power generation is stopped). On the other hand, as clearly seen from FIG. 2B where the buffer tank is provided, even when the heat dissipation of the heating terminal 32 is stopped to thereby decrease the heating load, the variation in heating load is absorbed by the buffer tank 21, so that a rapid increase of the coolant temperature is prevented. As a result, the driving of the gas engine 12 in association with the usage of the exhaust heat (power generation output) is continued. The continuous operation of the power generation unit 10 is possible, which leads to a decrease of a loss of power generation opportunities.

According to the aforementioned embodiment, the following effects are obtained. 1. According to the aforementioned embodiment, the buffer tank 21 that stores the coolant (surplus heat) is provided at the coolant circuit L1. Thus, even when the heating load of the heating terminal 32 decreases during the heating operation, for example, the surplus heat of the coolant is temporarily stored in the buffer tank 21 so as to be used when the heating load increases. As a result, the exhaust heat of the power generation unit 10 is effectively consumed by the heating circuit L2. That is, as long as the heating load exists, regardless of the variation thereof, the driving of the power generation unit 10 (the gas engine 12) and the usage of the exhaust heat thereof are continued, thereby appropriately utilizing the exhaust heat of the power generation unit 10. In particular, because a hot water storage tank is not required for recovering and storing the surplus heat of a heating circuit such as a floor heating circuit while the hot water storage tank is required according to a conventional cogeneration system, the heating operation is achievable without being affected by an influence of the hot water supply load.

In a case where the heating load is zero or small, the driving of the power generation unit 10 is forced to stop. However, even when the heating operation along with the usage of the exhaust heat of the power generation unit 10 is stopped in a state where the heating load is not present, an effect on energy saving is small.

2. According to the aforementioned embodiment, the heat exchange is obtained at the heater heat exchanger 22, between the coolant and the heating water of the heating water bypass circuit L3, which is substantially independent from the heating water of the heating circuit L2 leading to the backup hot water supply system 31. That is, the heat exchange with the coolant is achieved at the heater heat exchanger 22 by the circulation of the heating water of the heating water bypass circuit L3, which is substantially independent from the circulation of the heating water of the heating circuit L2 flowing through the backup hot water supply system 31. Thus, without an influence of heating of the heating water by the backup hot water supply system 31, the heat exchange between the coolant and the heating water is possible at the heating water bypass circuit L3. In addition, because the heating circuit L2 can be separated from the heating water bypass circuit L3, the heating circuit L2 can also be separated from the coolant circuit L1, i.e., the power generation unit 10, for example. Thus, a wide range of selection of the backup hot water supply system 31 (hot water heater 30) may be achieved. Further, because the heating water bypass circuit L3 is connected to the heating circuit L2, the number of parts is smaller than a case where a heat exchanger is provided between the heating water bypass circuit L3 and the heating circuit L2 in a state where the heating water bypass circuit L3 and the heating circuit L2 (collecting pipe 35) are separated from each other.

3. According to the aforementioned embodiment, a flow passage defined between the exits of the respective heating terminals 32 and the backup hot water supply system 31, which is bypassed by the heating water bypass circuit L3, is the collecting pipe 35 where the branch pipes 34b connected to the exits of the multiple heating terminals 32 are collected. Thus, as compared to a case where the heating water bypass circuit L3 is provided at a heating circuit (flow passage) individually provided at each of the multiple heating terminals 32, for example, the circuit configuration may be simplified.

4. According to the aforementioned embodiment, the bypass fluid pipe 24f bypassing the heater heat exchanger 22 and the buffer tank 21 is provided at the coolant circuit L1. Thus, in a case where the coolant temperature is low at a start of the power generation unit 10, for example, the coolant is bypassed by the bypass fluid pipe 24f to thereby decrease an apparent heat capacity of the coolant and immediately increase the coolant temperature. Then, a deterioration of durability of the power generation unit 10 (gas engine 12) caused by a long time period for the increase of the coolant temperature may be prevented.

5. According to the aforementioned embodiment, the thermostat valve 25 is a wax-type valve. Thus, a detection of the coolant temperature by the control unit 40 and a complicated changeover of the valve 25 for the temperature adjustment in association with the temperature detection are prevented. Consequently, reduction of cost and improvement of reliability may be achieved.

6. According to the aforementioned embodiment, the capacity of the buffer tank 21 is specified in the aforementioned range. Thus, the frequent start and stop of the gas engine 12 (i.e., intermittent operation thereof) is avoided while the increase of the arrangement space of the gas engine 12 is restrained.

The aforementioned embodiment may be modified as below. Instead of the thermostat valve 25 (wax valve), a control valve such as an electromagnetic valve that is controlled to open or close by the control unit 40 may be used.

In addition, the heating water bypass circuit L3 and the heating circuit L2 (collecting pipe 35) are separated from each other and between which a heat exchanger may be provided for performing the heat exchange.

Further, a fuel cell generating heat and electricity may be used as the power generation unit 10.

According to the aforementioned embodiment, the coolant resulting from the heat exchange with the heating water by the heat exchanging means 22 is stored in the buffer tank 21.

In addition, the heating terminal 32 includes a plurality of heating terminals 32, and the flow passage is a collecting pipe 35 where branch pipes 34b connected to the exits of the plurality of heating terminals 32 are collected.

The cogeneration system further includes the coolant bypass circuit 24f and the thermostat valve 25, the coolant bypass circuit 24f being provided at the coolant circuit L1 and bypassing the heat exchanging means 22 and the buffer tank 21, the thermostat valve 25 changing a circulation of the coolant to the coolant bypass circuit 24f in a case where a temperature of the coolant is low.

The power generation unit 10 includes a gas engine.

According to the aforementioned embodiment, the cogeneration system that absorbs load variations of the heating terminal 32 and that appropriately uses the exhaust heat of the power generation unit 10 is obtained without an enlargement of the system.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A cogeneration system comprising:
   a coolant circuit through which a coolant is circulated for conducting a heat exchange with an exhaust heat generated by a power generation unit;
   a buffer tank provided at the coolant circuit and storing the coolant;
   a heating circuit including a heating power source and a heating terminal, the heating power source generating a heating water that is circulated to be supplied to the heating terminal;
   a heating water bypass circuit bypassing a flow passage of the heating circuit at a portion between an exit of the heating terminal and the heating power source; and
   a heat exchanging means performing a heat exchange between the heating water flowing through the heating water bypass circuit and the coolant.

2. The cogeneration system according to claim 1, wherein the coolant resulting from the heat exchange with the heating water by the heat exchanging means is stored in the buffer tank.

3. The cogeneration system according to claim 2, wherein the heating terminal includes a plurality of heating terminals, and the flow passage is a collecting pipe where branch pipes connected to the exits of the plurality of heating terminals are collected.

4. The cogeneration system according to claim 1, further comprising a coolant bypass circuit and a selector valve, the coolant bypass circuit being provided at the coolant circuit and bypassing the heat exchanging means and the buffer tank, the selector valve changing a circulation of the coolant to the coolant bypass circuit in a case where a temperature of the coolant is low.

5. The cogeneration system according to claim 1, wherein the power generation unit is a gas engine.

* * * * *